US006426147B1

(12) United States Patent
Holzapfel et al.

(10) Patent No.: US 6,426,147 B1
(45) Date of Patent: Jul. 30, 2002

(54) SUBSTRATE HAVING A MULTILAYER COAT AND METHOD FOR ITS PRODUCTION

(75) Inventors: Klaus Holzapfel, Ascheberg; Heinrich Wonnemann, Telgte, both of (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/485,797

(22) PCT Filed: Jul. 25, 1998

(86) PCT No.: PCT/EP98/04688

§ 371 (c)(1), (2), (4) Date: Apr. 4, 2000

(87) PCT Pub. No.: WO99/08808

PCT Pub. Date: Feb. 25, 1999

(30) Foreign Application Priority Data

Aug. 16, 1997 (DE) ........................................ 197 35 540

(51) Int. Cl.[7] ................................................ B32B 27/38

(52) U.S. Cl. ....................... 428/414; 428/323; 428/418; 428/500

(58) Field of Search ................................ 428/212, 323, 428/414, 416, 500, 463, 407

(56) References Cited

U.S. PATENT DOCUMENTS

| | | | | |
|---|---|---|---|---|
| 3,341,580 A | | 9/1967 | Hechenbleikner | 260/541 |
| 3,477,990 A | | 11/1969 | Dante | 260/47 |
| 3,781,379 A | * | 12/1973 | Theodore et al. | 260/836 |
| 4,091,048 A | | 5/1978 | Labana et al. | 260/836 |
| 4,340,698 A | | 7/1982 | De Jongh et al. | 525/438 |
| 4,849,283 A | * | 7/1989 | Porter, Jr. et al. | 428/323 |
| 4,849,284 A | | 7/1989 | Arthur et al. | 428/325 |
| 5,055,524 A | * | 10/1991 | Pettit et al. | 525/172 |
| 5,084,541 A | | 1/1992 | Jacobs, III et al. | 528/45 |

FOREIGN PATENT DOCUMENTS

| | | | |
|---|---|---|---|
| BE | 756 693 | 3/1971 | |
| DE | 22 14 650 B2 | 3/1972 | C09D/3/80 |
| DE | 27 49 576 B2 | 11/1977 | C08F/220/18 |
| DE | 36 36 183 A1 | 10/1988 | C09D/5/38 |
| DE | 43 30 404 A1 | 9/1993 | C09D/5/46 |
| DE | 195 10 651 A1 | 3/1995 | C09D/175/04 |
| EP | 0 038 127 B1 | 3/1981 | B05D/7/26 |
| EP | 0 010 805 B1 | 2/1982 | C08G/59/68 |
| EP | 0 110 450 A1 | 1/1983 | C09D/3/64 |
| EP | 0 110 451 A1 | 1/1983 | C09D/3/64 |
| EP | 0 107 888 B1 | 6/1986 | C09D/3/64 |

(List continued on next page.)

OTHER PUBLICATIONS

Methoden der organischen Chemie, Houben–weyl, vol. 14/2, 4th edition No date.

Ullmanns Encyklopadie der technischen Chemie, 3rd edition, 14th Volume, Urban & Schwarzenberg, Munich Berlin, 1863, pp. 80–89 and pp. 99–105 No month.

Resines Alkydes–Polyesters by J. Bourry, Paris Verlag Dunod 1952, Alkyd Resins by C.R. Martens, Reinhold Publishing Corporation, New York 1961 and Alkyd Resin Technology by T.C. Patton, Intersciense Publishers 1962 No month.

Sienfken Liebigs Ann. Chem. (1949).

*Primary Examiner*—Merrick Dixon

(57) ABSTRACT

The invention relates to a substrate provided with a multilayer coating. The invention additionally relates to a process for its preparation, in which the body to be coated passes via the entry 1 into the pretreatment stage 2. This is followed by electrodeposition coating 3 and the baking 4 of the electrodeposition coat. In stage 5 preparation takes place for coating with powder coating material (stage 6). In stage 7 drying is carried out with IR irradiation. This is followed by the cooling stage 7. The powder coating material is applied to the powder coat in stage 9. Following passage through the intermediate drying stage 10 a protective coat is applied in stage 11 and then is baked in stage 12. The body is transported out of the unit via the exit 11.

9 Claims, 2 Drawing Sheets

FOREIGN PATENT DOCUMENTS

Figure 1:
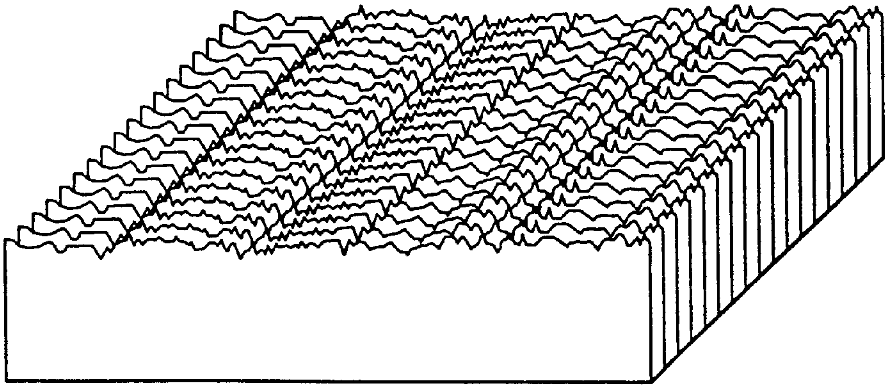

| | | | | |
|---|---|---|---|---|
| EP | 0 238 037 B1 | | 3/1987 | ............ B05D/1/38 |
| EP | WO87/02043 | | 4/1987 | ........... C08G/59/06 |
| EP | 0 119 164 B1 | | 6/1988 | ........... C08L/63/00 |
| EP | 0 299 420 A2 | | 7/1988 | ............ C09D/3/58 |
| EP | 0 326 230 A2 | | 1/1989 | ............ C09D/5/03 |
| EP | 0 371 522 A1 | | 10/1989 | ........... C08G/59/68 |
| EP | 0 389 926 A2 | | 3/1990 | ......... C08G/63/123 |
| EP | 0 509 392 A1 | | 4/1992 | ............ C09D/5/03 |
| EP | 0 509 393 A1 | | 4/1992 | ............ C09D/5/03 |
| EP | 0 322 827 B1 | | 6/1992 | ............ C09D/5/03 |
| EP | 0 517 536 A2 | | 6/1992 | ............ C09D/5/03 |
| EP | WO 96/38234 | * | 5/1996 | ............ B05D/7/00 |
| EP | WO 96/382345 | | 12/1996 | ............ B05D/7/00 |
| FR | 2 511 617 | | 2/1983 | ............ B05D/7/24 |

* cited by examiner

SUBSTRATE HAVING A MULTILAYER COAT AND METHOD FOR ITS PRODUCTION

The invention relates to a substrate provided with a multilayer coating which exhibits a surfacer layer, a colour and/or effect decorative layer and a protective layer, the surfacer layer being closest to the substrate and the protective layer furthest from the substrate, the decorative coating material used for the decorative layer comprising a binder from the group "acrylate resins, carboxyl-, epoxy-, and/or hydroxyl-containing binders" or mixtures thereof and comprising a crosslinker from the group "isocyanates, amino resins or TACT" or mixtures thereof and the protective coating material used for the protective layer being from the group "one-component clearcoats, two-component clearcoats, transparent powder coating materials", and to a process for preparing such a substrate provided with a multilayer coating.

A surfacer layer is prepared from a so-called surfacer. A surfacer is in essence a coating material but one having particular properties and being applied with a comparatively high layer thickness. The function of a surface layer is to even out disruptive unevennesses (in the micrometer range) on the surface of a substrate, so that the surface of the substrate need not be subjected to a levelling pretreatment prior to coating. The abovementioned comparatively high layer thickness of the surfacer is, inter alia, employed for this purpose. The surfacer may be applied to the material of the substrate directly or with interposition of a primer and/or adhesion promoter. In the former case, when applying the surfacer to a metallic material, it is advisable to use a surfacer having an anti-corrosive action. In the case of certain surfacers, which have now been surpassed technologically, it was necessary to subject the surfacer layer obtained following application and drying or curing of a surfacer to a levelling surface treatment, such as sanding. This involved making use of the fact that a surfacer layer is generally less hard and/or easier to work than the material of the substrate. Modern surfacers, by contrast, have a self-levelling function. This means that, following application of the surfacer to a substrate with surface defects, (initial) drying and (initial) crosslinking of the surfacer are all that is required to produce a surfacer layer whose outer surface is virtually level even in the micrometer range. In other words, the substrate-side boundary surface of the resulting surfacer layer forms a complement to the surface of the substrate, in terms of surface structures in the micrometer range. A decorative layer is formed from a decorative coating material. A decorative coating material has not only customary coatings binders and crosslinkers but also, in particular, colour and/or special-effect pigments. Examples of special-effect pigments are metallic pigments and mica pigments. The decorative layer is essentially responsible for the visual impression to a viewer of the substrate provided with the multilayer coating. A protective layer is generally formed from a clearcoat. This clearcoat must have particular properties in terms of its behaviour relative to mechanical stress, chemical stress and light stability and in terms of its transmission behaviour, since the protective layer is exposed to the environment and is intended, in particular, to protect the decorative layer. Multilayer coatings of the type described are used in particular for coating motor vehicle bodies or parts thereof made from sheet steel or sheet aluminum, but also for coating plastic mouldings that are employed in the motor vehicle sector.

The document FR 2 511 617 discloses the application of subsequent layers to a primer/surfacer layer and only there-after the curing of the multilayer coating thus formed. This procedure is dubbed "wet on wet" technology. With the processes known to this extent, as far as the primer/surfacer layer is concerned, a customary aqueous primer/surfacer is employed. It has been found, however, that above certain applied layer thicknesses (which are necessary for levelling out substrate defects if in-between sanding is to be avoided) there are instances of matting and impaired flow. A substrate provided with a multilayer coating and a process for its preparation, of the type specified at the outset, are known from the document EP 0 238 037 B1. In this case, an electrodeposition coating material is used for the primer/surfacer layer. This electro-deposition coating material is initially baked. The decorative layer and the protective layer are then applied "wet on wet", it being possible for the coating materials used for this purpose to be aqueous coating materials. Especially in the case of decorative layers comprising an effect coating material, however, it has been found in accordance with this document that it is absolutely necessary to interpose a separating layer between primer and surfacer layer in order that the effect of the coating on the finished product satisfies the visual requirements. The need for a separating layer is a nuisance because of the effort required. On grounds of energy consumption, the separate process step of baking required for the primer/surfacer layer is a nuisance. A further factor is that satisfactory results are only achieved when the separating layer is based on organic solvents. This is a nuisance for environmental reasons. If an aqueous coating material is used for the separating layer it is disadvantageous, moreover, that rapid initial drying of the separating layer prior to applying the subsequent layers cannot easily be achieved. As a result, the effort and/or the production time is increased to an undesirable extent.

Against this background, the technical problem on which the invention is based is to specify a substrate provided with a multilayer coating that can be prepared with little effort and unproblematic environmental characteristics, and a process for its preparation.

To solve this technical problem the invention teaches that the surfacer layer is formed from a precrosslinkable powder coating material, the powder—coating surfacer layer having a layer thickness in the range from 30 $\mu$m to 250 $\mu$m.—The particular advantages of the use of a powder coating material for preparing a surfacer layer are, inter alia, that it can be done without solvent and that the losses that occur due to overspray with customary surfacers are avoided since virtually all of the non-adhering powder coating material can be recycled. All customary prior art methods are suitable for the application of the powder coating material. Particular preference is given to application by means of electrostatic adhesion, preferably by applying a high voltage or by frictional charging.

The coating of substances with powder coating materials is per se a common process. The pulverulent dry coating material is applied uniformly to the substrate to be coated and then the coating material is melted and baked by heating the substrate. In the context of the invention, however, and in departure from this customary procedure, the powder coating material is first of all precrosslinked by heating and is only baked together with the layers applied subsequently. Therefore, relative to the prior art, a separate process step of baking for the surfacer layer is omitted. Instead, all layers of coating material are baked in a common step, leading, surprisingly, to a multilayer coating which satisfies all the requirements. This approach implies a considerable simplification of the coating process. The abandonment of an intermediate baking operation reduces both the capital and operating costs. Only a single baking oven need be made available and operated. As a result, there is also a saving on heating energy. In addition, the overall operating time for the coating operation is shorter, and so the productivity of the unit is increased.

Suitable formulations for the powder coating material are all known coating-material formulations: for example, those described in EP-509 392, EP-509 393, EP-322 827, EP-517 536, U.S. Pat. No. 5,055,524 and U.S. Pat. No. 4,849,283. The powder coating material may in particular consist of epoxy resins, hybrid systems comprising polyester resin, and also epoxidized novolaks, and of crosslinking agents, preferably phenolic or amine-type hardeners (curing agents) or bicyclic guanidines, catalysts, fillers and, if desired, auxiliaries and additives.

The powder coating materials employed in accordance with the invention preferably comprise epoxy resins, phenolic crosslinking agents, catalysts, assistants and also, if desired, auxiliaries and typical powder additives, and flow aids. Suitable epoxy resins are all solid epoxy resins having an epoxy equivalent weight of between 400 and 3000, preferably from 600 to 2000. They principally comprise epoxy resins based on bisphenol A and bisphenol F. Preference is given to epoxidized novolak resins. These preferably have an epoxide equivalent weight of from 500 to 1000.

The epoxy resins based on bisphenol A and bisphenol F generally have a functionality of less than 2, the epoxidized novolak resins a functionality of greater than 2. Particular preference is given, in the powder coating materials employed in accordance with the invention, to epoxidized novolak resins having an average functionality in the range from 2.4 to 2.8 and having an epoxide equivalent weight in the range from 600 to 850. In the epoxidized novolak resins, the phenolic hydroxyl groups are etherified with alkyl, acrylic or similar groups. Epoxide groups are introduced into the molecule by reacting the phenolic hydroxyl groups with epichlorohydrins. Starting from novolaks, this forms the so-called epoxy-novolak. The epoxidized novolaks are structurally related to bisphenol A resins. Epoxidized novolak resins can be prepared by epoxidizing novolaks consisting, for example, of 3 to 4 phenol nuclei attached to one another via methylene bridges. Alkyl-substituted phenols which are reacted with formaldehyde can also be used as novolak resins.

Suitable epoxy resins are, for example, the products obtainable commercially under the following names: Epikote 1004, 1055, 3003, 3004, 2017 from Shell-Chemie, DER 640, 671, 662, 663U, 664, 667 from Dow and Araldit GT 6063, 6064, 6084, 6097, 7004, 7220, 7225 from Ciba Geigy.

Examples of resins suitable as the epoxy-functional binder for the powder coating material are polyacrylate resins which contain epoxide groups and can be prepared by copolymerizing at least one ethylenically unsaturated monomer which contains at least one epoxide group in the molecule with at least one further ethylenically unsaturated monomer which contains no epoxide group in the molecule, at least one of the monomers being an ester of acrylic acid or methacrylic acid.

Polyacrylate resins which contain epoxide groups are known (cf. e.g. EP-A-299 420, DE-B-22 14 650, DE-B-27 49 576, U.S. Pat. No. 4,091,048 and U.S. Pat. No. 3,781, 379).

Examples of the ethylenically unsaturated monomers which contain at least one epoxide group in the molecule are glycidyl acrylate, glycidyl methacrylate and allyl glycidyl ether.

Examples of ethylenically unsaturated monomers which contain no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acids such as, for example, acrylic acid and methacrylic acid, acid amides, such as acrylamide and methacrylamide, vinylaromatic compounds, such as styrene, methylstyrene and vinyl toluene, nitrites, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The polyacrylate resin containing epoxide groups normally has an epoxide equivalent weight of from 400 to 2500, preferably from 500 to 1500 and, with particular preference, from 600 to 1200, a number-average molecular weight (determined by gel permeation chromatography using a polystyrene standard) of from 1000 to 15,000, preferably from 1200 to 7000 and, with particular preference, from 1500 to 5000, and a glass transition temperature ($T_g$) of from 30 to 80, preferably from 40 to 70 and, with particular preference, from 50 to 70° C. (measured by means of differential scanning calorimetrie (DSC)).

The polyacrylate resin containing epoxide groups can be prepared by generally well-known methods, by means of free-radical addition polymerization.

Examples of suitable hardeners for the polyacrylate resin which contains epoxide groups are polyanhydrides of polycarboxylic acids or of mixtures of polycarboxylic acids, especially polyanhydrides of dicarboxylic acids or of mixtures of dicarboxylic acids.

Polyanhydrides of this kind can be prepared by removing water from the polycarboxylic acid or from the mixture of polycarboxylic acids, with in each case two carboxyl groups being reacted to form one anhydride group.

Preparation processes of this kind are well known and so need not be discussed further.

For curing the epoxy resins, the powder coating material which is to this extent used in accordance with the invention comprises phenolic or amine-type hardeners. It is also possible to employ bicyclic guanidines.

In this context, for example, any desired phenolic resin can be used provided that it has the methylol functionality required for reactivity. Preferred phenolic resins are reaction products of phenol, substituted phenols and bisphenol A with formaldehyde that are prepared under alkaline conditions. Under such conditions, the methylol group is linked to the aromatic ring in either ortho or para position. As phenolic crosslinking agents it is particularly preferred to employ hydroxyl-containing bisphenol A resins or bisphenol F resins having a hydroxy equivalent weight in the range from 180 to 600 and, with particular preference, in the range from 180 to 300. Phenolic crosslinking agents of this kind are prepared by reacting bisphenol A or bisphenol F with glycidyl-containing components, such as the diglycidyl ether of bisphenol A, for example. Phenolic crosslinking agents of this kind are obtainable, for example, under the commercial designation DEH 81, DEH 82 and DEH 87 from Dow DX 171 from Shell-Chemie and XB 3082 from Ciba Geigy.

In this context, the epoxy resins and phenolic crosslinking agents are employed in a ratio such that the number of epoxide groups to the number of phenolic OH groups is approximately 1:1.

Such powder coating materials, used in accordance with the invention, comprise one or more suitable catalysts for epoxy resin curing. Suitable catalysts are phosphonium salts of organic or inorganic acids, imidazole and imidazole derivatives, quaternary ammonium compounds, and amines. The catalysts are generally employed in proportions of from 0.001% by weight to about 10% by weight, based on the overall weight of the epoxy resin and the phenolic crosslinking agent.

Examples of suitable phosphonium salt catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide tetrabutylphosphonium bromide and tetrabutylphosphonium acetate-acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

In some cases, customary commercial phenolic crosslinking agents already include catalysts for epoxy resin crosslinking.

Powder coating materials based on carboxyl-containing polyesters and on epoxy-containing crosslinking agents of low molecular mass are known in large numbers and are described, for example, in EP-A-389 926, EP-A-371 522, EP-A-326 230, EP-B-110 450, EP-A-110 451, EP-B-107 888, US 4,340,698, EP-B-119 164, WO 87/02043 and EP-B-10 805.

Also particularly suitable are powder coating materials in accordance with DE 43 30 404.4 A1, which are characterized in that they comprise as film-forming material A) 35.0–92.2% by weight of carboxyl-containing polyesters having an acid number of 10–150 mg of KOH/g, B) 0.8–20.1% by weight of epoxy-containing curing agents of low molecular mass, C) 3.7–49.3% by weight of epoxy-containing polyacrylate resins having an epoxide equivalent weight of 350–2000 and D) 0.5–13.6% by weight of low molecular mass di- and/or polycarboxylic acids and/or di- and/or polyanhydrides, the sum of the proportions by weight of A), B), C) and D) in each case being 100% by weight and the ratio of the epoxide groups of the powder coating materials to the sum of the carboxyl and anhydride groups of the powder coating materials being 0.75–1.25:1.

The carboxyl-containing polyesters used as component A) have an acid number in the range of 10–150 mg of KOH/g, preferably in the range of 30–100 mg of KOH/g. The hydroxyl number of the polyester resins should be <30 mg of KOH/g. It is preferred to employ polyesters having a carboxy functionality of >2. The polyesters are prepared by the customary methods (compare e.g. Houben Weyl, Methoden der Organischen Chemie, 4th edition, Volume 14/2, Georg Thieme Verlag, Stuttgart 1961).

Suitable carboxylic acid components for preparing the polyesters are aliphatic, cycloaliphatic and aromatic di- and polycarboxylic acids, such as phthalic, terephthalic, isophthalic, trimellitic, pyromellitic, adipic, succinic, glutaric, pimelic, suberic, cyclohexanedicarboxylic, azelaic and sebacic acid and the like. These acids can in this context also be employed in the form of their esterifiable derivatives (e.g. anhydrides) or their transesterifiable derivatives (e.g. dimethyl esters).

Suitable alcohol components for preparing the carboxyl-containing polyesters A) are the commonly employed di- and/or polyols, examples being ethylene glycol, 1,2-propanediol and 1,3-propanediol, butanediols, diethylene glycol, triethylene glycol, tetraethylene glycol, 1,6-hexanediol, neopentyl glycol, 1,4-dimethylolcyclohexane, glycerol, trimethylolethane, trimethylolpropane, pentaerythritol, ditrimethylolpropane, dipentaerythritol, diglycerol, and the like.

The polyesters thus obtained can in this context be employed individually or as a mixture of different polyesters. The polyesters suitable as component A) generally have a glass transition temperature of above 30° C.

Examples of suitable customary commercial polyesters are the products obtainable commercially under the following trade names: Crylcoat 314, 340, 344, 2680, 316, 2625, 320, 342 and 2532 from UCB, Drogenbos, Belgium; Grilesta 7205, 7215, 72-06, 72-08, 72-13, 72-14, 73-72, 73-93 and 7401 from Ems-Chemie; Neocrest P670, P671, P672, P678, P662 from ICI and Uralac P2400, Uralac P3400 and Uralac P5000 from DSM.

Unsaturated, carboxyl-containing polyester resins are also suitable as acidic polyester component A). They are obtained by polycondensation of, for example, maleic acid, fumaric acid or other aliphatic or cycloaliphatic dicarboxylic acids having an ethylenically unsaturated double bond, alone or together with saturated polycarboxylic acids, as polycarboxylic acid component. The unsaturated groups can also be introduced into the polyester through the alcohol component, e.g. through trimethylolpropane monoallyl ether.

The powder coating materials used to this extent in accordance with the invention comprise as component B) 0.8–20.1% by weight of epoxy-containing curing agents of low molecular mass. An example of a particularly suitable epoxy-containing curing agent of low molecular mass is triglycidyl isocyanurate (TGIC). TGIC is obtainable commercially, for example, under the designation Araldit PT 810 (manufacturer: Ciba Geigy) Other suitable epoxy-containing curing agents of low molecular mass are 1,2,4-triglycidyltriazoline-3,5-di- one, diglycidyl phthalate, and the diglycidyl ester of hexahydrophthalic acid.

By epoxy-containing polyacrylate resins (component C) are meant polymers preparable by copolymerizing at least one ethylenically unsaturated monomer which contains at least one epoxide group in the molecule with at least one further ethylenically unsaturated monomer which contains no epoxide group, at least one of the monomers being an ester of acrylic acid or of methacrylic acid.

Polyacrylate resins which contain epoxide groups are known (cf. e.g. EP-A-299 420, DE-B-22 14 650, U.S. Pat. No. 4,091,048 and U.S. Pat. No. 3,781,379).

Examples of ethylenically unsaturated monomers which contain at least one epoxide group in the molecule are glycidyl acrylate, glycidyl methacrylate and allyl glycidyl ether.

Examples of ethylenically unsaturated monomers which contain no epoxide group in the molecule are alkyl esters of acrylic and methacrylic acid which contain 1 to 20 carbon atoms in the alkyl radical, especially methyl acrylate, methyl methacrylate, ethyl acrylate, ethyl methacrylate, n-butyl acrylate, isobutyl acrylate, t-butyl acrylate and the corresponding methacrylates, 2-ethylhexyl acrylate and 2-ethylhexyl methacrylate. Further examples of ethylenically unsaturated monomers which contain no epoxide groups in the molecule are acids such as, for example, acrylic acid and methacrylic acid, acid amides, such as acrylamide and methacrylamide, vinylaromatic compounds, such as styrene, methylstyrene and vinyltoluene, nitrites, such as acrylonitrile and methacrylonitrile, vinyl halides and vinylidene halides, such as vinyl chloride and vinylidene fluoride, vinyl esters, such as vinyl acetate and vinyl propionate, and hydroxyl-containing monomers, such as hydroxyethyl acrylate and hydroxyethyl methacrylate, for example.

The polyacrylate resin containing epoxide groups (component C) has an epoxide equivalent weight of from 350 to 2000. The epoxy-containing polyacrylate resins normally have a number-average molecular weight (determined by gel permeation chromatography using a polystyrene standard) of from 1000 to 15,000 and a glass transition temperature ($T_g$) of 30–80 (measured by means of differential scanning calorimetry (DSC).

The epoxy-containing acrylate resin can be prepared by generally well-known methods, by free-radical addition polymerization. Such epoxy-containing polyacrylate resins are obtainable commercially, for example, under the designation Almatex PD 7610 and Almatex PD 7690 (manufacturer: Mitsui Toatsu).

As binders, powder coating materials used to this extent in accordance with the invention include as component D) 0.5–13.6% by weight of low molecular mass di- and/or polycarboxylic acids and/or di- and/or polyanhydrides. It is preferred as component D) to use saturated, aliphatic and/or cycloaliphatic dicarboxylic acids, such as glutaric, adipic, pimelic, suberic, azelaic, cyclohexanedicarboxylic, sebacic, malonic, dodecanedioic and succinic acids. Also suitable as component D) are aromatic di- and polycarboxylic acids, such as phthalic, terephthalic, isophthalic, trimellitic and pyromellitic acids, also of course in the form of their anhydrides where they exist.

Particular preference is given to dodecanedioic acid (=1,10-g decanedicarboxylic acid) for use as component D).

The amounts of the powder coating components A) to D) are chosen such that the ratio of the epoxide groups of B) and C) to the sum of the carboxyl and anhydride groups of A) and D) is 0.75–1.25:1. This ratio is preferably 0.9–1.1:1.

The powder coating material can contain from 50 to 90%, preferably from 60 to 80% by weight of binders and from 10 to 50% by weight, preferably from 20 to 40% by weight of fillers. Suitable fillers are crystalline modifications of silica functionalized with glycidyl groups. They are normally employed in the stated range of from 10 to 50% by weight, based on the overall weight of the powder coating material. In certain cases, however, proportions of filler of more than 50% by weight are also possible. The crystalline modifications of silica include quartz, cristobalite, tridymite, keatite, stishovite, melanophlogite, coesite and fibrous silica. The crystalline modifications of silica are functionalized with glycidyl groups, the glycidyl-group functionalization being obtained by means of a surface treatment. The silica modifications concerned comprise, for example, those based on quartz, cristobalite and fused silica that are prepared by treating the crystalline silica modifications with epoxysilanes. The glycidyl-functionalized silica modifications are obtainable commercially, for example, under the designation Silbondo® 600 EST and Silbond® 6000 EST (manufacturer: Quarzwerke GmbH) and are prepared by reacting crystalline silica modifications with eooxysilanes. The powder coating materials advantageously include from 10 to 40% by weight, based on the overall weight of the powder coating material, of glycidyl-functionalized crystalline silica modifications.

The powder coating material may also comprise further inorganic fillers, examples being titanium oxide, barium sulphate and silicate-based fillers, such as talc, kaolin, magnesium silicates, aluminum silicates, mica and the like, for example. The powder coating materials may additionally comprise, if desired, auxiliaries and additives. Examples thereof are levelling agents, flow aids and degassing agents, such as benzoin, for example.

The powder coating materials are prepared by known methods (cf. e.g. product information from BASF Lacke+Farben AG, "Pulverlacke" [Powder coating materials], 1990) by homogenization and dispersion by means, for example, of an extruder, screw compounder and the like. Following preparation of the powder coating material, it is adjusted to the desired particle size distribution by milling and, if desired, by sieving and classifying. To promote non-destructive expulsion of gas it is also possible to add degassing agents to the powder coating material, preferably benzoylphenylmethanol (benzoin®) in concentrations of up to 2% by weight, preferably 0.4% by weight.

For the decorative layer it is possible to use all common aqueous decorative coating materials from the stated group. Reference is made in this context, for example, to the documents EP 89 497 or EP 38 127. Suitable crosslinkers are isocyanates, amino resins and/or TACT (tris[alkoxycarbonylamino]triazines, especially as described in the document U.S. Pat. No. 5,084,541).

Preference is given to a decorative coating material which comprises an aqueous polymer dispersion comprising (i) an acrylate polymer based on from 30 to 60% by weight of $C_1$–$C_8$-alkyl (meth)acrylate monomers, from 30 to 60% by weight of vinylaromatic monomers and from 0.5 to 10% by weight of (meth)acrylic acid and (ii) a non-associative thickener which comprises an acrylate copolymer based on $C_1$–$C_6$-alkyl (meth)acrylate and (meth)acrylic acid.

As $C_1$–$C_8$-alkyl (meth)acrylate monomer units the acrylate polymer of component (i) that is employed can comprise the linear and branched-chain derivatives, preference being given to methyl (meth)acrylate, ethyl (meth)acrylate, n-propyl and isopropyl (meth)acrylate, n-butyl and isobutyl (meth)acrylate and 2-ethylhexyl (meth)acrylate. Further monomers which may be present include (meth)acrylamide monomers and derivatives thereof.

Vinylaromatic monomers present as monomer units in the acrylate polymer of component (i) can be, for example, styrene, -alkylstyrene and vinyltoluene.

The acrylate polymer can be prepared by processes known from the prior art, such as emulsion polymerization. The acrylate polymer is preferably employed in the form of a dispersion. During the preparation process, the quantitative proportion between the monomers and the water is adjusted preferably such that the resulting dispersion has a solids content of from 30 to 60% by weight, preferably from 35 to 60% by weight, and can be employed directly for preparing the basecoating composition. A particularly suitable acrylate polymer is obtainable commercially as an aqueous dispersion under the designation Acronal 290 D (BASF AG; Ludwigshafen).

To prepare a dispersion of the acrylate polymer it is preferred, as emulsifier, to employ an anionic emulsifier alone or in a mixture with others.

Examples of anionic emulsifiers are the alkali metal salts of sulphuric monoesters of alkylphenols or alcohols, and also the sulphuric monoesters of ethoxylated alkylphenols or ethoxylated alcohols, preferably the alkali metal salts of the sulphuric monoester of a nonylphenol reacted with from 4 to 5 mol of ethylene oxide per mole, alkyl- or arylsulphonate, sodium lauryl sulphate, sodium lauryl ethoxylate sulphate and secondary sodium alkanesulphonates whose carbon chain contains 8–20 carbon atoms. The amount of the anionic emulsifier is from 0.1 to 5.0% by weight, based on the monomers, preferably from 0.5 to 3.0% by weight. In order to increase the stability of the aqueous dispersions it is also possible in addition to employ a nonionic emulsifier of the type of an ethoxylated alkylphenol or fatty alcohol—for example, an adduct of 1 mol of nonylphenol and from 4 to 30 mol of ethylene oxide—in a mixture with the anionic emulsifier.

The glass transition temperature of the acrylate polymer preferably lies between 15° C. and 35° C. and, with particular preference, between 20° C. and 25° C.

The acrylate polymer employed preferably has a number-average molecular mass (determination: by gel permeation chromatography with polystyrene as standard) of from 200, 000 to 2,000,000, preferably from 300,000 to 1,500,000.

As thickener component (ii) in the decorative coating material use is made, in accordance with the invention, of acrylate copolymers having non-associative groups, which comprise $C_1$–$C_6$-alkyl (meth)acrylate and (meth)acrylic acid as monomer units. A preferred copolymer comprises as its monomer units (meth)acrylic acid and at least two different $C_1$–$C_6$-alkyl (meth)acrylate monomers. In the copolymer the (meth)acrylic acid is present preferably in amounts of from 40% by weight to 60% by weight and, with particular preference, from 46% by weight to 55% by weight, based on the amount of the copolymer as a whole. The $C_1$–$C_6$-alkyl (meth)acrylate monomer I is preferably present in amounts of from 30% by weight to 50% by weight, in particular from 36% by weight to 46% by weight, and the (meth)acrylate polymer II preferably in amounts of from 1% by weight to 10% by weight, in particular from 2% by weight to 8% by weight, based in each case on the amount of the copolymer as a whole. The Theological auxiliary is intended to give the decorative coating material the desired viscosity, especially at the generally alkaline pH that is employed. A particularly preferred thickener is—if in dispersion form—highly mobile and thickens at a neutral or basic pH. The acrylate copolymer is the suitably employed as a finished dispersion. As emulsifiers, such dispersions preferably contain fatty alcohol alkoxylates, especially $C_8$–$C_{22}$ fatty alcohol ethoxylates. A particularly suitable acrylate copolymer dispersion is obtainable commercially under the designation Viscalex HV 30 (Allied Corporation, Great Britain).

In the decorative coating material used, the thickener is preferably present in an amount of from 0.5 to 5.0% by weight, in particular from about 0.3 to 1.5% by weight, based on the solids content. The thickener is customarily employed as a dispersion having a concentration of from 5 to 45% by weight, preferably from 7 to 35% by weight.

The decorative coating material may also include further thickeners and/or Theological auxiliaries, such as ionic phyllosilicates, xanthan gum, diurea compounds, polyurethane thickeners, bentonite, waxes, and wax copolymers.

As auxiliary binders, the decorative coating material may also include epoxy-functional and/or carboxyl-functional constituents, such as customary glycidyl compounds, examples being glycidyl acrylate or glycidyl methacrylate. Examples of suitable carboxyl-functional crosslinkers are carboxylic acids, especially saturated, straight-chain, aliphatic dicarboxylic acids having 3 to 20 carbon atoms in the molecule, preference being given to the use of dodecane-1, 12-dioic acid.

As a further auxiliary binder, polyvinyl alcohol may also be employed. It has been found that by adding polyvinyl alcohol in an amount of up to 10% by weight, preferably from 1 to 5% by weight, it is possible to improve the compatibility with the protective coating materials that are applied to the decorative coating material. Polyvinyl alcohol has a solvent-repelling effect, so that any solvent present in the protective coating material, or other components, are unable—owing to the repelling action of the polyvinyl alcohol—to penetrate the decorative coating material and alter the colour.

As further crosslinkers it is possible to employ the crosslinkers known in the paints sector, such as melamine resins, which are able to react with free OH groups.

In addition to the polymers described above, the decorative coating material may also include further compatible water-dilutable resins, such as amino resins, polyesters, polyurethanes and also acrylicized polyurethanes and urethanized acrylates, which serve as additives for achieving particular paints properties, such as improved adhesion, or, in general, as grinding resins for pigments.

The auxiliary binder and/or the crosslinker can be employed in an amount of up to 10% by weight, in particular from 0.5 to 10% by weight.

The decorative coating material employed generally has a solids content of from about 15 to 60% by weight. The solids content varies with the type of effect of the decorative coating material. For metallic coating materials, for example, it is preferably from 12 to 25% by weight. For solid-colour coating materials it is higher, preferably from 14 to 45% by weight.

In order to neutralize components (i) and (ii) it is possible to employ ammonia and/or amines (especially alkylamines), amino alcohols and cyclic amines, such as di- and triethylamine, aminomethylpropanol, dimethylaminoethanolamine, diisopropanolamine, morpholine, N-alkylmorpholine. For neutralization, readily volatile amines are preferred. The aqueous coating composition is usually adjusted to a pH of between 6 and 9, preferably from 7 to 8.5.

The decorative coating material can comprise organic solvents in an amount of up to 15% by weight. Examples of suitable organic solvents are naphthalenes, petroleum spirits and alcohols. As further liquid components the basecoats of the invention may include alkylene glycols, such as ethylene glycol, propylene glycol, butylene glycol, 1,4-butanediol, 1,6-hexanediol, neopentyl glycol and other diols, such as dimethylolcyclohexane.

As pigments, the decorative coating material may include customary pigments employed for coating car bodies, such as, for example, special-effect pigments and also organic and inorganic colour pigments. Examples of suitable special-effect pigments are customary commercial aluminum bronzes, the aluminum bronzes chromated in accordance with DE-A 36 36 183, customary commercial stainless-steel bronzes and also other customary metal platelets and metal flake pigments, and nonmetallic special-effect pigments, such as pearl lustre pigments and interference pigments, for example. Examples of suitable inorganic colour pigments are titanium dioxide, iron oxides and carbon black and the like. Examples of organic colour pigments are Indanthrene blue, Cromophthal red, Irgazine orange, Sicotrans yellow, Heliogen green and the like. It is also possible for anticorrosive pigments such as zinc phosphate, to be present, In addition, the decorative coating material may also contain fillers customary in the field of paint chemistry. These include silica, magnesium silicate, talc, titanium dioxide and barium sulphate. The proportion of pigments and fillers in the decorative coating material may amount in total to from 3 to 25% by weight, based on the solids content. The pigment can be added in any desired form, for example as an aqueous slurry or as a paste. The pigments may be dispersed, for example, with a grinding resin, such as an auxiliary binder, dispersing auxiliary or water. In the case of solid-colour coating materials it is preferred to slurry the pigments in dispersing auxiliary and water. Where aluminum and/or flakes are employed they are, if desired, slurried in solvent and, if appropriate, in a mixture of water and wetting agent or are dispersed in the principal binder or in another, auxiliary binder. The amount of component (i) can vary depending on the pigment employed. Where the pigments are organic and/or inorganic colour pigments, component A is preferably present in an amount of from 25 to 50% by weight, based on the solids content. Where the pigments are special-effect pigments, component A is preferably present in an amount of from 15 to 30% by weight based on the solids content.

As a further component the decorative coating material may include film-forming auxiliaries. Suitable film-forming auxiliaries are dialkyl dicarboxylates, 1,2-propylene glycol, high-boiling petroleum spirits, and naphthalenes, having a boiling point of more than 100° C., preferably more than 140° C. The decorative coating material may also, if desired, contain further auxiliaries and additives. Examples of these are catalysts, assistants, antifoams, dispersing auxiliaries, wetting agents, preferably carboxy-functional dispersants, antioxidants, UV absorbers, free-radical scavengers, levelling agents, biocides and/or water-retention agents.

If desired, prior to application to the surfacer layer, water can be added to the decorative coating material in order to adjust the solids content, or solvents or Theological auxiliaries can be added in order to establish the performance properties, and also, if desired, a base can be added to regulate the pH. If the viscosity is still not within the desired range, further Theological auxiliary (ii) or further thickener, if appropriate in an amount of from 0.001 to 0.006% by weight, based on the solids content, can be added.

In addition, conventional powder coating materials are also suitable as the decorative coating material or colour-imparting layer of coating material.

Suitable aqueous protective coating materials are all common transparent coating materials. Particular preference is given to the use of the following protective coating materials.

A first preferred protective coating material is an aqueous powder coating dispersion and is characterized in that the aqueous powder coating dispersion can be prepared by subjecting an aqueous dispersion of a powder coating material having a glass transition temperature of from 20 to 90° C., preferably from 40 to 70° C., a viscosity of from 10 to 1000 mPas, preferably from 50 to 300 mPas, at a shear rate of 500 s-1 and a solids content of from 10 to 50%, preferably from 20 to 40%, to a grinding process while observing a temperature of from 0 to 60° C., preferably from 5 to 35° C. The specific energy input during the grinding process is preferably from 20 to 500 Wh/kg, in particular from 50 to 250 Wh/kg.

In terms of chemical composition, this aqueous powder coating dispersion is constructed, for example, such that it consists of a solid pulverulent component A and of an aqueous component B, component A being a powder coating material comprising a) at least one epoxy-containing binder having a content of from 30 to 45%, preferably from 30 to 35% of glycidyl-containing monomers with or without a content of vinylaromatic compounds, preferably styrene, b) at least one crosslinking agent, preferably straight-chain, aliphatic dicarboxylic acids and/or carboxy-functional polyesters, and c) if desired, catalysts, assistants, additives typical of powder coating materials, such as degassing agents, levelling agents, UV absorbers, free-radical scavengers and antioxidants, and component B being an aqueous dispersion comprising a) at least one nonionic thickener and b) if desired, catalysts, assistants, antifoams, dispersing auxiliaries, wetting agents, preferably carboxy-functional dispersants, antioxidants, UV absorbers, free-radical scavengers, small amounts of solvent, levelling agents, biocides and/or water-retention agents.

Examples of suitable epoxy-functional binders for component A are polyacrylate resins which contain epoxide groups and can be prepared by copolymerizing at least one ethylenically unsaturated monomer which contains at least one epoxide group in the molecule with at least one further ethylenically unsaturated monomer which contains no epoxide group in the molecule, at least one of the monomers being an ester of acrylic acid or methacrylic acid. Polyacrylate resins of this kind containing epoxide groups are known, for example, from EP-A-299 420, DE-B-22 14 650, DE-B-27 49 576, U.S. Pat. No. 4,091,048 and U.S. Pat. No. 3,781,379).

Examples of ethylenically unsaturated monomers which contain no epoxide group in the molecule are alkyl esters of acrylic and methacrylic acid which contain 1 to 210 carbon atoms in the alkyl radical, especially methyl acrylate, methyl methacrylate, ethyl acrylate, ethyl methacrylate, butyl acrylate, butyl methacrylate, 2-ethylhexyl acrylate and 2-ethylhexyl methacrylate. Further examples of ethylenically unsaturated monomers which contain no epoxide groups in the molecule are acid amides, such as acrylamide and methacrylamide, vinylaromatic compounds, such as styrene, methylstyrene and vinyltoluene, nitrites, such as acrylonitrile and methacrylonitrile, vinyl halides and vinylidene halides, such as vinyl chloride and vinylidene fluoride, vinyl esters, such as vinyl acetate, and hydroxyl-containing monomers, such as hydroxyethyl acrylate and hydroxyethyl methacrylate, for example.

The polyacrylate resin containing epoxide groups normally has an epoxide equivalent weight of from 400 to 2500, preferably from 420 to 700, a number-average molecular weight (determined by gel permeation chromatography using a polystyrene standard) of from 2000 to 20,000, preferably from 3000 to 10,000 and a glass transition temperature ($T_g$) of from 30 to 80, preferably from 40 to 70 and, with particular preference, from 40 to 60° C. (measured by means of differential scanning calorimetry (DSC)). Very particular preference is given to about 50° C. It is also possible to employ mixtures of two or more acrylate resins.

The polyacrylate resin containing epoxide groups can be prepared by generally well-known methods, by means of addition polymerization.

Suitable crosslinkers are carboxylic acids, especially saturated straight-chain aliphatic dicarboxylic acids having 3 to 20 carbon atoms in the molecule. It is very particularly preferred to employ decane-1,12-dicarboxylic acid. For modifying the properties of the finished transparent powder coating materials it is also possible if desired to employ other carboxyl-containing crosslinkers. Examples thereof which may be mentioned are saturated branched or unsaturated straight-chain di- and polycarboxylic acids and also polymers having carboxyl groups.

Also suitable, furthermore, are components A which comprise an epoxy-functional crosslinker and an acid-functional binder.

Examples of suitable acid-functional binders are acidic polyacrylate resins which can be prepared by copolymerizing at least one ethylenically unsaturated monomer which contains at least one acid group in the molecule with at least one further ethylenically unsaturated monomer which contains no acid groups in the molecule.

The binder containing epoxide groups or the crosslinker containing epoxide groups and the carboxyl- or the binder are normally employed in an amount such that there are from 0.5 to 1.5, preferably from 0.75 to 1.25 equivalents of carboxyl groups per equivalent of epoxide groups. The amount of carboxyl groups present can be determined by titration with an alcoholic KOH solution.

The binder contains vinylaromatic compounds, especially styrene. To limit the risk of cracking, however, the content is not above 35% by weight. Preference is given to from 10 to 25% by weight.

The components A may include one or more suitable catalysts for epoxy resin curing. Suitable catalysts are phosphonium salts of organic or inorganic acids, quaternary ammonium compounds, amines, imidazole and imidazole derivatives. The catalysts are generally employed in proportions of from 0.001% by weight to about 2% by weight, based on the overall weight of the epoxy resin and of the crosslinking agent.

Examples of suitable phosphonium catalysts are ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetate-acetic acid complex. These and other suitable phosphonium catalysts are described, for example, in U.S. Pat. No. 3,477,990 and U.S. Pat. No. 3,341,580.

Examples of suitable imidazole catalysts are 2-styrylimidazole, 1-benzyl-2-methylimidazole, 2-methylimidazole and 2-butylimidazole. These and other imidazole catalysts are described, for example, in Belgian Patent No. 756,693.

In addition, the components A may also if desired comprise auxiliaries and additives. Examples thereof are levelling agents, antioxidants, UV absorbers, free-radical scavengers, flow aids and degassing agents, such as benzoin, for example. Suitable levelling agents are those based on polyacrylates, polysiloxanes and/or fluorine compounds. Antioxidants which can be employed are reducing agents, such as hydrazides and phosphorus compounds, and also free-radical scavengers, e.g. 2,6-di-tert-buthylphenol derivatives. UV absorbers which can be used are preferably triazines and benzotriphenol. Free-radical scavengers which can be employed are preferably 2,2,6,6 tetramethylpiperidine derivatives.

As a further constituent, the aqueous component B of the powder coating dispersion contains at least one nonionic thickener a). It is preferred to employ nonionic associative thickeners a). Structural features of such associative thickeners a) are: aa) a hydrophilic framework, which ensures sufficient solubility in water, and ab) hydrophobic groups which are capable of associative interaction in an aqueous medium.

Examples of hydrophobic groups employed are long-chain alkyl radicals, such as dodecyl, hexadecyl or octadecyl radicals, or alkaryl radicals, such as octylphenyl or nonylphenyl radicals, for example. Hydrophilic frameworks employed are preferably polyacrylates, cellulose ethers or, with particular preference, polyurethanes, which contain the hydrophobic groups as polymer units.

Very particular preference is given as hydrophilic frameworks to polyurethanes which comprise polyether chains as units, preferably comprising polyethylene oxide. In connection with the synthesis of such polyether polyurethanes the di- and/or polyisocyanates, preferably aliphatic diisocyanates, and, with particular preference, unsubstituted or alkyl-substituted 1,6-hexamethylene diisocyanate, serve to link the hydroxyl-terminated polyether units to one another and to link the polyether units to the hydrophobic endgroup units, which may, for example, be monofunctional alcohols and/or amines having the already mentioned long-chain alkyl radicals or aralkyl radicals.

Component B may also include catalysts, levelling agents, antioxidants, UV absorbers, free-radical scavengers and wetting agents. Essentially, suitable substances here are those already listed for component A. It is also possible for assistants, antifoams, dispersion auxiliaries, biocides, solvents and neutralizing agents to be added to component B. Suitable antifoams are preferably modified polysiloxanes. Dispersion auxiliaries are, for example, preferably ammonium or metal salts of polycarboxylates. Neutralizing agents which can be used are amines, ammonia and metal hydroxides.

Component A is prepared by known methods (cf. e.g. product information from BASF Lacke+Farben AG, "Pulverlacke" [Powder coatings], 1990) by homogenization and dispersion by means, for example, of an extruder, screw compounder and the like. Following preparation of the powder coating materials, they are prepared for dispersion by grinding and, if appropriate, by sieving and classifying. The aqueous transparent powder coating dispersion can then be prepared from the powder by wet grinding or by stirring in dry-ground powder coating material. Wet grinding is particularly preferred. The resulting average particle size lies between 1 and 25 $\mu$m, preferably below 20 $\mu$m and, very preferably, from 3 to 10 $\mu$m. It is important that during the grinding process the dispersion contains only small amounts of solvent. It may therefore be necessary under certain circumstances to free the mill from solvent residues before beginning the grinding process.

Before or after wet grinding and/or the introduction of component A into the water it is possible to add to the dispersion from 0 to 5% by weight of an antifoam mixture, an ammonium and/or alkali metal salt, a carboxyl-functional or nonionic dispersion auxiliary, wetting agent and/or thickener mixture and also the other additives. Antifoam, dispersing auxiliary, wetting agent and/or thickener are preferably dispersed first of all in water. Then small portions of component A are stirred in. Subsequently, antifoam, dispersing auxiliary, thickener and wetting agent are incorporated again by dispersion. Finally, component A is stirred in again in small portions. Adjustment of the pH takes place preferably using ammonia or amines. In this context the pH may first of all rise, to form a strongly basic dispersion. However, the pH falls again over several hours or days to the values specified above. The powder coating dispersions can be applied to the decorative layer using the methods known from liquid coatings technology. In particular, they can be applied by means of spraying processes. Also suitable are electrostatically assisted high-speed rotation or pneumatic applications. The transparent powder coating dispersion applied to the decorative layer is in most cases flashed off prior to baking. This judiciously takes place first at room temperature and then at slightly elevated temperature. In general the elevated temperature is from 40 to 70° C., preferably from 50 to 65° C. Flashing off is carried out for 2 to 10 minutes, preferably from 4 to 8 minutes, at room temperature. At elevated temperature, flashing off is again carried out for the same period of time. With a protective coating material of the type described above it is possible to achieve layer thicknesses of from 30 to 50 $\mu$m.

A second preferred protective coating material is a two-component clearcoat comprising (1) a hydroxy-functional binder or a mixture of hydroxy-functional binders, (2) tris(alkoxycarbonylamino)triazine or a mixture of tris (alkoxycarbonylamino)triazines, and (3) free polyisocyanates or a mixture of free polyisocyanates.

Suitable hydroxy-functional binders are preferably those based on hydroxy-functional polyacrylates, hydroxy-functional polyesters and/or hydroxy-functional polyurethanes.

It is preferred to employ polyacrylate resins which have hydroxyl numbers of from 40 to 240, preferably from 60 to 210 and, with very particular preference, from 100 to 200, acid numbers of from 0 to 35, preferably from 0 to 23, and, with very particular preference, from 3.9 to 15.5, glass transition temperatures of from −35 to +70° C., preferably from −20 to +40° C. and, with very particular preference, from −10 to +15° C. and number-average molecular weights of from 1500 to 30,000, preferably from 2000 to 15,000 and, with very particular preference, from 2500 to 5000.

The glass transition temperature of the polyacrylate resins is determined by the nature and amount of the monomers employed. The selection of the monomers can be made by the skilled worker with the aid of the following formula, which can be used to calculate approximately the glass transition temperatures of polyacrylate resins:

$$\frac{1}{T_g} = \sum_n \frac{W_n}{T_{gn}};\ \sum_n W_n = 1$$

$T_g$=Glass transition temperature of the polyacrylate resin n Number of different monomers copolymerized in the polyacrylate resin $W_n$=Proportion by weight of the nth monomer $T_{gn}$=Glass transition temperature of the homopolymer of the nth monomer Measures to control molecular weight (e.g. selection of appropriate polymerization initiators, use of chain transfer agents, etc.) belong to the technical knowledge of the person of average skill in the art and do not need to be elucidated further here.

As hydroxy-functional binder component use is also made with particular preference of polyester resins or alkyd resins which can be prepared by reacting (a) a cycloaliphatic or aliphatic polycarboxylic acid or a mixture of such polycarboxylic acids, (b) an aliphatic or cycloaliphatic polyol having more than two hydroxy groups in the molecule or a mixture of such polyols, (c) an aliphatic or cycloaliphatic diol or a mixture of such diols, and (d) an aliphatic linear or branched saturated monocarboxylic acid or a mixture of such monocarboxylic acids in a molar ratio of (a): (b): (c): (d)=1.0:0.2–1.3:0.0–1.1:0.0–1.4, preferably 1.0:0.5–1.2:0.0–0.6:0.2–0.9, to give a polyester resin or alkyd resin.

Examples of component (a) are: hexahydrophthalic acid, 1,4-cyclohexanedicarboxylic acid, endomethylenetetrahydrophthalic acid, oxalic acid, malonic acid, succinic acid, glutaric acid, adipic acid, pimelic acid, suberic acid, azelaic acid and sebacic acid.

Examples of component (b) are: pentaerythritol, trimethylolpropane, trimethylolethane and glycerol.

Examples of component (c) are: ethylene glycol, diethylene glycol, propylene glycol, neopentyl glycol, 2-methyl-2-propylpropane-1,3-diol, 2-ethyl-2-butylpropane-1,3-diol, 2,2,4-trimethylpentane-1,5-diol, 2,2,5-trimethylhexane-1,6-diol, neopentyl glycol hydroxypivalate and dimethylolcyclohexane.

Examples of component (d) are: 2-ethylhexanoic acid, lauric acid, isooctanoic acid, isononanoic acid and monocarboxylic acid mixtures obtained from coconut oil or palm kernel oil.

The preparation of hydroxyl-bearing polyester resins and/or alkyd resins is described, for example, in Ullmanns Encyklopadie der technischen Chemie, 3rd edition, 14th Volume, Urban & Schwarzenberg, Munich, Berlin, 1863, pages 80 to 89 and pages 99 to 105, and in the following books: Résines Alkydes-Polyesters by J. Bourry, Paris Verlag Dunod 1952, Alkyd Resins by C. R. Martens, Reinhold Publishing Corporation, New York 1961 and Alkyd Resin Technology by T. C. Patton, Interscience Publishers 1962.

Polyurethane-based protective coating materials are also suitable.

Suitable crosslinking agents are all compounds known per se, e.g. polyisocyanates, melamine resins, etc. In the case of this preferred protective coating material, however, it is preferred for it to comprise the crosslinking agents (2) and (3).

As component (2) use is made of tris (alkoxycarbonylamino)triazines of the formula $$\frac{1}{T_g} = \sum_n \frac{W_n}{T_{gn}};\ \sum_n W_n = 1$$

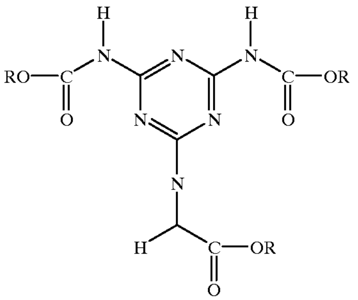

where R=methyl, butyl- . . . groups. It is likewise possible for derivatives of the compounds mentioned to be employed. For component (2) it is preferred to employ tris (alkoxycarbonylamino)triazines as are described in U.S. Pat. No. 5,084,541.

The carbamate groups react preferentially with OH carriers and, specifically, with hydroxyl groups having as little steric hindrance as possible. Amino groups cannot be crosslinked by the tris(alkoxycarbonylamino)triazine. Instead, there is elimination of the carbalkoxy group.

Component (3) comprises as crosslinking agent(s) at least one preferably non-blocked di- and/or polyisocyanate which may if desired be in solution or dispersion in one or more organic solvents, which may in turn be dilutable in water.

The polyisocyanate component comprises any desired organic polyisocyanates having free isocyanate groups attached to aliphatic, cycloaliphatic, araliphatic and/or aromatic structures. It is preferred to employ polyisocyanates having from 2 to 5 isocyanate groups per molecule and having viscosities of from 100 to 2000 mPas (at 23° C.). If desired, small amounts of organic solvent, preferably from 1 to 25% by weight based on pure polyisocyanate, can be added to the polyisocyanates in order thus to improve the ease of incorporation of the isocyanate and, if desired, to reduce the viscosity of the polyisocyanate to a value within the abovementioned ranges. Examples of solvents suitable as additions to the polyisocyanates are ethoxyethyl propionate, butyl acetate and the like.

Examples of suitable isocyanates are described, for example, in "Methoden der organischen Chemie", Houben-Weyl, Volume 14/2, $4^{th}$ edition, Georg Thieme Verlag, Stuttgart 1963, page 61 to 70, and by W. Siefken, Liebigs Ann. Chem. (1949) 562, 75 to 136. Suitable, for example, are the isocyanates referred to in connection with the description of the polyurethane resins (A2), and/or polyurethane prepolymers which contain isocyanate groups, can be prepared by reacting polyols with an excess of polyisocyanates and are preferably of low viscosity.

It is also possible to employ polyisocyanates which contain isocyanurate groups and/or biuret groups and/or allophanate groups and/or urethane groups and/or urea groups and/or uretdione groups. Polyisoeyanates containing urethane groups, for example, are obtained by reacting some of the isocyanate groups with polyols, such as trimethylolpropane and glycerol, for example.

It is preferred to employ aliphatic or cycloaliphatic polyisocyanates, especially hexamethylene diisoeyanate, dimerized and trimerized hexarnethylene diisocyanate, isophorone diisocyanate, 2-isocyanatopropylcyclohexyl isocyanate, dicyclohexylmethane 2,4'-diisocyanate or dicyclohexylmethane 4,4'-diisocyanate or mixtures of these polyisocyanates. Very particular preference is given to the use of mixtures of polyisocyanates, based on hexamethylene diisocyanate, which contain uretdione and/or isocyanurate groups and/or allophanate groups, as are formed by catalytic oligomerization of hexamethylene diisocyanate using appropriate catalysts. The polyisocyanate component may otherwise consist, in addition, of any desired mixtures of the polyisocyanates mentioned by way of example.

The polyisocyanate component is employed in the coating compositions of the invention advantageously in an amount such that the ratio of the hydroxyl groups of the binder (A) to the isocyanate groups of the crosslinkers (2) and (3) lies between 1:2 and 2:1 and, with particular preference, between 1:1.5 and 1.5:1.

The crosslinker mixture contains preferably from 1 to 99% by weight, with particular preference from 5 to 90% by weight of tris(alkoxycarbonylamino)triazine and, preferably, from 99 to 1% by weight and, with particular preference, from 95 to 10% by weight of free isocyanate or of a mixture of free polyisocyanates.

In addition to the components stated, the protective coating material may also include light stabilizers, for example triazine compounds. In addition, Theological agents may also be added.

In a preferred variant, the protective coating material is stored in the form of at least two separate components (I) and (II) which are not mixed with one another until directly prior to application. It is preferred for the tris(alkoxycarbonylamino)triazine in a mixture with the hydroxy-functional binder to form component I and for the free polyisocyanate to form component II of the protective coating material or two-component clearcoat. In the case of a two-component system, the protective coating material is designed such that a) one component (I) comprises a hydroxy-functional binder or a mixture of hydroxy-functional binders and tris(alkoxycarbonylamino)triazine, and b) the second component (II) comprises free isocyanate or a mixture of free polyisocyanates. Preparation of the two components (I) and (II) takes place by the customary methods from the individual constituents with stirring. Preparation of the protective coating material from components (I) and (II) takes place likewise by means of stirring or dispersing using the commonly employed apparatus; for example, by means of dissolvers or the like or by means of likewise customarily employed 2-component metering and mixing units or by means of the process for preparing aqueous 2-component polyurethane coating materials that is described in DE-A-195 10 651, page 2, line 62 to page 4, line 5.

A preferred embodiment of the invention is characterized in that the decorative layer has a layer thickness in the range of 10 $\mu$m to 100 $\mu$m and in that the protective layer has a layer thickness in the range from 20 $\mu$m to 150 $\mu$m. It is advantageous, specifically, if the surfacer layer has a layer thickness in the range of 50 $\mu$m to 80 $\mu$m, preferably from 60 $\mu$m to 70 $\mu$m, if the decorative layer has a layer thickness in the range of 15 $\mu$m to 17 $\mu$m, preferably from 15 $\mu$m to 16 $\mu$m, and if the protective layer has a layer thickness in the range from 35 $\mu$m to 50 $\mu$m. preferably from 40 $\mu$m to 45 $\mu$m. This achieves on the one hand an optimum surface quality and on the other hand an optimum decorative effect.

The surfacer layer may lie directly on the substrate material. Alternatively, between the substrate and the surfacer layer there may be at least one further layer, for example an anti-corrosive layer.

A preferred use of the invention comprises the substrate being a metal panel, preferably a motor vehicle bodywork panel. A further use comprises the substrate being a plastics moulding, preferably a motor vehicle plastics moulding based on PVC.

The invention also relates to a process for preparing a substrate provided with a multilayer coating, especially a motor vehicle bodywork panel or a motor vehicle plastics moulding, according to one of claims 1 to 6, comprising the following subsequent process steps:

a) a crosslinkable powder coating material is applied to the substrate, b) the powder coating material is dried and precrosslinked by means of irradiation or heating for from 1 minute to 10 minutes at a temperature in the range from 130 degrees C to 240 degrees C, c) an aqueous decorative coating material is applied to the dried and precrosslinked powder coating material and is dried, d) an aqueous protective coating material is applied to the decorative coating, e) the assembly of powder coating material, decorative coating material and protective coating material is baked and crosslinked at a temperature in the range from 120 degrees C to 180 degrees C.

Prior to step a) it is possible, if desired, for an electrodeposition coating operation to take place with subsequent baking of the coating layer.

In detail it is preferred if the powder coating material is dried and precrosslinked for from 2 minutes to 6 minutes, preferably for from 3 minutes to 4 minutes, at a temperature of from 180 degrees C to 220 degrees C, preferably by the passage of the substrate that has been provided with the powder coating material through an IR irradiation zone.

A coating which satisfies all requirements is obtained if the assembly of powder coating material, decorative coating material and protective coating material is baked and crosslinked at a temperature in the range from 130 degrees C to 150 degrees C, preferably at 150 degrees C.

An embodiment of the process of the invention that is particularly advantageous in terms of energy consumption and environmental protection is characterized in that an aqueous decorative coating material which is virtually free from organic solvents and an aqueous protective coating material which is virtually free from organic solvents, or an aqueous transparent powder coating dispersion, are used and in that the powder coating material, the decorative coating material and the protective coating material are applied and baked in a coating unit which is operated with circulating air. The invention is elucidated further in the text below using examples.

EXAMPLE 1

Powder Coating Material for the Surfacer Layer

EXAMPLE 1

Preparing a Powder Coating Material

Premixing

| The following items are weighed in: | | |
|---|---|---|
| 120.30 kg | 20.1% | Epoxy resin |
| 228.30 kg | 38.1% | Polyester |
| 121.80 kg | 20.3% | $TIO_2$ |
| 118.80 kg | 19.8% | Filler |
| 2.40 kg | 0.4% | Benzoin |
| 2.40 kg | 0.4% | Wax |
| 6.00 kg | 1.0% | Levelling additive |
| 600.00 kg | 100.0% | |

The components are subsequently mixed in an overhead mixer for 5 minutes.

Extrusion

The premix is supplied to the extruder, in this case a single-screw extruder of type Buss PCS 100.

In other words, extrudate is rolled as a sheet on a cooling belt, cooled, fractionated and recovered as chips.

Milling and Classifying

The chips are supplied to a classifier mill of type ACM 40 and are classified in-line with a cyclone classifier.

The resulting coarse fraction G1 is discharged using a cellular wheel sluice and constitutes the useful material. The fine fraction is deposited by the stream of air on an absolute filter (surface filter made from PE needlefelt) and likewise discharged via a cellular wheel sluice. Particle size distribution: $x_{10}>10$ μm; $x_{90}<40$ μm.

EXAMPLE 2

Decorative Coating Materials for the Decorative Layer

EXAMPLE 2.1

A. A reaction vessel was charged with 22 parts by weight of water, 2 parts by weight of Solvesso 200 ($C_{10}$–$C_{13}$ aromatics mixture) and 1 part by weight of butyl glycol. With stirring, 30 parts by weight of Acronal 290 D (aqueous dispersion, solids content 50.0%) were added.

B. A mixture of 7.6 parts by weight of water and 2 parts by weight of Viscalex HV 30 (solids content 30.6%) was added slowly to the mixture obtained in A.

The pH of the resulting mixture was adjusted to 8.0 with dimethylethanolamine (DMEA).

C. In a separate mixer, a mixture of 5 parts by weight of aluminum flakes and 5 parts by weight of butyl glycol was stirred until smooth.

With vigorous stirring, the aluminum suspension obtained in C. was added in portions to the mixture obtained in B.

The viscosity of the resulting coating material was adjusted to 110 mPas using 25 parts by weight of water. The solids content was 18.85%.

EXAMPLE 2.2

A. A reaction vessel was charged with 22 parts by weight of water, 2 parts by weight of Solvesso 200 ($C_{10}$–$C_{13}$ aromatics mixture) and 1 part by weight of butyl glycol. With stirring, 25 parts by weight of Acronal 290 D (aqueous dispersion, solids content 50.0%) were added.

B. A mixture of 7.6 parts by weight of water and 2 parts by weight of Viscalex HV 30 (solids content 30.6%) was added slowly to the mixture obtained in A.

The pH of the resulting mixture was adjusted to 8.0 with 0.4 part by weight of dimethylethanolamine (DMEA).

C. In a separate mixer, a mixture of 5 parts by weight of aluminum flakes and 5 parts by weight of butyl glycol was stirred until smooth.

D. In a further separate mixer, 5 parts by weight of glycidyl methacrylate-dodecanedioic acid were dispersed in 25 parts by weight of water and milled to a particle size of less than 5 μm.

The mixture obtained in B was incorporated with vigorous stirring into the dispersion obtained in D.

The aluminum suspension obtained in C was then added in portions to the resulting mixture.

The viscosity of the resulting coating material was adjusted to 110 mPas using 25 parts by weight of water. The solids content was 18.35%.

EXAMPLE 2.3

A coating formulation was prepared by the procedure described in Example 2.2, with the exception that in step D 10 parts by weight of glycidyl methacrylate/dodecanedioic acid were dispersed in 20 parts by weight of water.

The solids content was 20.35%.

EXAMPLE 2.4

A. A reaction vessel was charged with 22 parts by weight of water, 2 parts by weight of Solvesso 200 ($C_{10}$–$C_{13}$ aromatics mixture) and 1 part by weight of butyl glycol. With stirring, 30 parts by weight of Acronal 290 D (aqueous dispersion, solids content 50.0%) were added.

B. A mixture of 7.6 parts by weight of water and 2 parts by weight of Viscalex HV 30 (solids content 30.6%) was added slowly to the mixture obtained in A.

The pH of the resulting mixture was adjusted to 8.0 with 0.4 part by weight of dimethylethanolamine (DMEA).

C. In a separate mixer, a mixture of 5 parts by weight of aluminum flakes and S parts by weight of butyl glycol was stirred until smooth.

In a further separate mixer, 10 parts by weight of a polyester obtained from 9.8% by weight of neopentyl glycol, 6.2% by weight of hexahydrophthalic acid, 22.9% by weight of Pripol (commercial product from Unichema), 11.1% by weight of hexanediol and 2.0% by weight of xylene as solvent, and 2.2 parts by weight of melamine Cymel 303 (Cyanamid) were dispersed in 12.8 parts by weight of water.

The mixture obtained in B was incorporated with vigorous stirring into the dispersion obtained in D.

The aluminum suspension obtained in C was then added in portions to the resulting mixture.

The solids content of the coating material was 26.83%.

EXAMPLE 2.5

A. A reaction vessel was charged with 22 parts by weight of water, 2 parts by weight of Lusolvan FBH (commercial product from BASF AG, Ludwigshafen) and 1 part by weight of butyl glycol. With stirring, 30 parts by weight of Acronal 290 D (aqueous dispersion, solids content 50.0%) were added.

B. A mixture of 7.6 parts by weight of water and 2 parts by weight of Viscalex HV 30 (solids content 30.6%) was added slowly to the mixture obtained in A.

The pH of the resulting mixture was adjusted to 8.0 with dimethylethanolamine (DMEA).

C. 30 parts by weight of an Irgazine red DPP BO paste (pigment content 43.2% by weight) were added to the mixture obtained in step B, and the resulting mixture was stirred until smooth.

The viscosity of the resulting coating material was adjusted to 110 mPas with 5 parts by weight of water.

EXAMPLE 2.6

A. A reaction vessel was charged with 22 parts by weight of water, 2 parts by weight of Lusolvan FBH (commercial product of BASF AG, Ludwigshafen) and 1 part by weight of butyl glycol. With stirring, 25 parts by weight parts by weight of Acronal 290 D (aqueous dispersion, solids content 50.0%) were added.

B. A mixture of 7.6 parts by weight of water and 2 parts by weight of Viscalex HV 30 (solids content 30.6%) was added slowly to the mixture obtained in A.

The pH of the resulting mixture was adjusted to 8.0 with dimethylethanolamine (DMEA).

C. In a separate mixer, 28.79 parts by weight of an Irgazine red DPP BO paste (pigment content 43.2% by weight), 1.17 parts by weight of Disperbyk 190 (dispersion auxiliary) and 0.03 part by weight of the copolymer employed in step B were dispersed and ground to a particle size of less than 5 μm.

D. In a further separate mixer, 5 parts by weight of glycidyl methacrylate-dodecanedioic acid were dispersed in 25 parts by weight of water and milled to a particle size of less than 5 μm.

The mixture obtained in B was incorporated with vigorous stirring into the dispersion obtained in D.

The pigment paste obtained in C was then added in portions to the resulting mixture.

The solids content was 28.06%.

EXAMPLE 2.7

The procedure described in Example 2.6 was repeated except that in step A 20 parts by weight of the acrylate dispersion and in step D 10 parts by weight of glycidyl methacrylate/dodecanedioic acid were employed.

EXAMPLE 2.8

A. A reaction vessel was charged with 22 parts by weight of water, 2 parts by weight of Lusolvan FBH (commercial product of BASF AG, Ludwigshafen) and 1 part by weight of butyl glycol. With stirring, 15 parts by weight of Acronal 290 D (aqueous dispersion, solids content 50.0%) acrylate dispersion were added.

B. A mixture of 7.6 parts by weight of water and 2 parts by weight of Viscalex HV 30 (solids content 30.6%) was added slowly to the mixture obtained in A.

The pH of the resulting mixture was adjusted to 8.0 with dimethylethanolamine (DMEA).

C. In a separate mixer, 28.79 parts by weight of an Irgazine red DPP BO paste (pigment content 43.2% by weight), 1.17 parts by weight of Disperbyk 190 and 0.03 part by weight of the copolymer employed in step B were dispersed and ground to a particle size of less than 5 μm.

D. In a further separate mixer, 10 parts by weight of a polyester obtained from 9.8% by weight of neopentyl glycol, 6.2% by weight of hexahydrophthalic acid, 22.9% by weight of Pripol (commercial product from Unichema), 11.1% by weight of hexanediol and 2.0% by weight of xylene as solvent, and 2.2 parts by weight of melamine Cymel 303 (Cyanamid) were dispersed in 12.8 parts by weight of water.

The mixture obtained in B was then incorporated with vigorous stirring into the dispersion obtained in D. The pigment preparation prepared in step B was then incorporated by stirring.

The solids content was 29.04%.

EXAMPLE 3

Protective Coating Materials for the Protective Layer

EXAMPLE 3.1

A. Preparing an acrylate resin: 21.1 parts of xylene are charged to a vessel and heated to 130° C. Into the initial charge over 4 h at 130° C. by way of two separate feed vessels there are metered: initiator: 4.5 parts of TBPEH (tert-butyl perethylhexanoate) mixed with 4.86 parts of xylene; and monomers: 10.78 parts of methyl methacrylate, 25.5 parts of n-butyl methacrylate, 17.39 parts of styrene and 23.95 parts of glycidyl methacrylate. The batch is then heated to 180° C. and the solvent is stripped off under reduced pressure<100 mbar.

B. Preparing a transparent powder coating material: 77.5 parts of acrylate resin, 18.8 parts of dodecanedicarboxylic acid (see hardener), 2 parts of Tinuvin 1130 (UV absorber), 0.9 part of Tinuvin 144 (HALS), 0.4 part of Additol XL 490 (levelling agent) and 0.4 part of benzoin (degassing agent) are intimately mixed on a Henschel fluid mixer, extruded on a BUSS PLK 46 extruder, milled on a Hosokawa ACM 2 mill and screened off over a 125 μm sieve.

C. Preparing a dispersion: 0.6 part of Troykyd D777 (antifoam), 0.6 part of Orotan 731 K (dispersing auxiliary), 0.06 part of Surfinol TMN 6 (wetting agent) and 16.5 parts of RM8 (Rohm & Haas, nonionic associative thickener based on polyurethane) are dispersed in 400 parts of deionized water. Then 94 parts of the transparent powder coating material are incorporated in small portions with stirring. Subsequently, a further 0.6 part of Troykyd D777, 0.6 part of Orotan 731 K, 0.06 part of Surfinol TMN 6 and 16.5 parts of RM8 are incorporated by dispersion. Finally, 94 parts of the transparent powder coating material are incorporated in small portions with stirring. The material is milled in a sand mill for 3.5 h. The finally measured average particle size is 4 μm. The material is filtered through a 50 μm filter and finally 0.05% of Byk 345 (levelling agent) is added.

D. Applying the dispersion: the slurry is applied by means of a cup gun to steel panels coated with aqueous basecoat. The panel is flashed off at room temperature for 5 minutes and at 60° C. for 5 minutes.

Subsequently, the panel is baked for 30 minutes at a temperature of 140° C. With a layer thickness of 40 μm a highly glossy clearcoat film with MEK resistance (>100 double strokes) is produced. The clearcoat film exhibits good condensation resistance.

EXAMPLE 3.2

3.2.1. Preparing Binder Solutions

A. Acrylate Resin A 899 g of a fraction of aromatic hydrocarbons having a boiling range of 158° C.–172° C. are weighed into a laboratory reactor having a useful volume of 4 l and equipped with a stirrer, two dropping funnels for the monomer mixture and initiator solution respectively, nitrogen inlet pipe, thermometer and reflux condenser. The solvent is heated to 140° C. After the solvent has reached 140° C., a monomer mixture of 727 g of n-butyl metbacrylate, 148 g of cyclohexyl methacrylate, 148 g of styrene, 445 g of 4-hydroxybutyl acrylate and 15 g of acrylic acid is metered over the course of 4 hours, and an initiator solution of 29 g of t-butyl perethylhexanoate in 89 g of the aromatic solvent described above, over the course of 4.5 hours, into the reactor at a uniform rate. The metered addition of the monomer mixture and the initiator solution is commenced simultaneously. Following the end of the metered addition of an initiator, the reaction mixture is held at 140° C. for two hours more and then cooled. The resulting polymer solution has a solids content of 62% determined in a convection oven at 130° C. for 1 h), an acid number of 9 and a viscosity of 21 dPas (measured on a 60% strength solution of the polymer solution in the aromatic solvent described above, using an ICI plate/cone viscometer at 23° C.).

B. Acrylate Resin B 897 g of a fraction of aromatic hydrocarbons having a boiling range of 158° C.–172° C. are weighed into a laboratory reactor having a useful volume of 4 l and equipped with a stirrer, two dropping funnels for the monomer mixture and initiator solution respectively, nitrogen inlet pipe, thermometer and reflux condenser. The solvent is heated to 140° C. After the solvent has reached 140° C., a monomer mixture of 487 g of t-butyl acrylate, 215 g of n-butyl methacrylate, 143 g of styrene, 572 9 of hydroxypropyl methacrylate and 14 g of acrylic acid is metered over the course of 4 hours, and an initiator solution of 86 g of t-butyl perethylhexanoate in 86 g of the aromatic solvent described above, over the course of 4.5 hours, into the reactor at a uniform rate. The metered addition of the monomer mixture and the initiator solution is commenced simultaneously. Following the end of the metered addition of an initiator, the reaction mixture is held at 140° C. for two hours more and then cooled. The resulting polymer solution has a solids content of 62% determined in a convection oven at 130° C. for 1 h), an acid number of 10 and a viscosity of 23 dPas (measured on a 60% strength solution of the polymer solution in the aromatic solvent described above, using an ICI plate/cone viscometer at 23° C.).

C. Alkyd Resin C 1330 g of hexahydrophthalic anhydride, 752 g of 1,1,1-trimethylolpropane, 249 g of 1,4-dimethylolcyclohexane, 204 g of hexane-1,6-diol, 136 g of isononanoic acid (as an isomer mixture of 3,3,5-trimethylhexanoic acid and 3,5,5-trimethylhexanoic acid) and 75 g of xylene as entrainer are weighed into a laboratory reactor having a useful volume of 4 l and equipped with a stirrer, water separator, reflux condenser, nitrogen inlet pipe and thermometer. The water separator is precipitated with xylene. The contents of the reactor are heated over the course of 8 hours to 210° C. at a level such that uniform reflux of the entrainer results. The contents of the reactor are held at 210° C. until an acid number of 17.1 and a viscosity of 15 dpas, measured on a 60% strength solution of the reaction mixture in the aromatic solvent described for the acrylate resins A and B, have been reached. The batch is then cooled to 140° C. and the contents of the reactor are diluted with an amount of the stated aromatic solvent such as to give a nonvolatiles content of 61% (determined in a convection oven at 130° C. for 60 minutes). The alkyd resin solution prepared in this way has an acid number of 17.1 and a viscosity of 15 dPas (measured on an ICI plate/cone viscometer at 23° C.).

3.2.2 Preparing the Two-component Clearcoats

A: Component 1

Component 1 of the two-component clearcoats is prepared by weighing in the binder solution and then adding, with stirring, the amounts indicated in Table 1 of triazine crosslinker, solvent, UV absorber, free-radical scavenger and levelling agent and stirring these components in thoroughly. The amounts given in this table and the subsequent tables are to be understood as amounts by weight.

TABLE 1

| | Comp. 1a | Comp. 1b | Comp. 1c | Comp. 1d | Comp. 1e | Comp. 1f |
|---|---|---|---|---|---|---|
| Acrylate resin A | 79.6 | 55.0 | | | | |
| Acrylate resin B | | | 62.8 | 50.0 | | |
| Alkyd resin C | | | | | 72.0 | 62.0 |
| Triazine crosslinker U.S. Pat. No. 5,084,541 | | 13 | | 12.8 | | 10.0 |
| Tiniuvin 400 | 1.3 | 1.3 | 1.0 | 1.0 | | |
| Tiniuvin 123 | 1.0 | 1.0 | 1.5 | 1.5 | | |
| Tiniuvin 384 | | | | | 1.2 | 1.2 |
| Tiniuvin 292 | | | | | 1.0 | 1.0 |
| Silicone 1 solution | 2.5 | 2.5 | 2.5 | 2.5 | 3.0 | 3.0 |
| Butyl diglycol acetate | 4.0 | 4.0 | 10.0 | 10.0 | 9.0 | 9.0 |
| Butyl glycol acetate | 4.0 | 4.0 | 8.0 | 8.0 | 5.5 | 5.5 |
| Methoxypropyl acetate | 3.0 | 3.6 | 8.0 | 8.4 | | |
| Solvent naphtha | | | | | 5.1 | 5.1 |
| Butyl acetate | 4.6 | 15.6 | 5.8 | 5.8 | 3.2 | 3.2 |

B: Component 2

Component 2 consists of a solution of customary commercial isocyanurate trimers in an appropriate solvent. It is prepared by stirring the solvent into the supply form of the isocyanurates in accordance with Table 2.

TABLE 2

| | Component 2a | Component 2b |
|---|---|---|
| Desmodur Z4470 | 63.5 | 26.5 |
| Tolonate HDT 90 | 24.8 | |
| Basonat HI 190 B/S | | 61.8 |
| Solvent naphra | 5.85 | 5.85 |
| Butyl acetate | 5.85 | 5.85 |

C: Preparing the Clearcoats

The clearcoats are prepared by mixing components 1 and 2 in the proportions indicated in Table 3 and applying the mixture immediately after mixing. Alternatively, it is also possible to carry out application using special two-component units which are known to the person of average skill in the art and hence need not be described in any more detail here. Table 3 also includes properties of the clearcoats, which elucidate the invention.

VDA621–427 with 2×500 g of steel chips and 2 bar air pressure gave a KW1.

Figure 2:
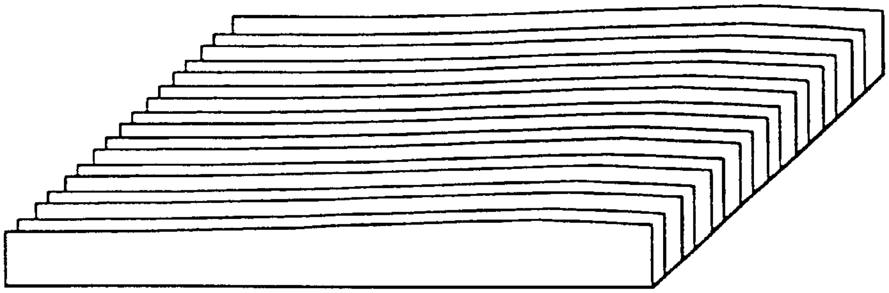
Figure 3:
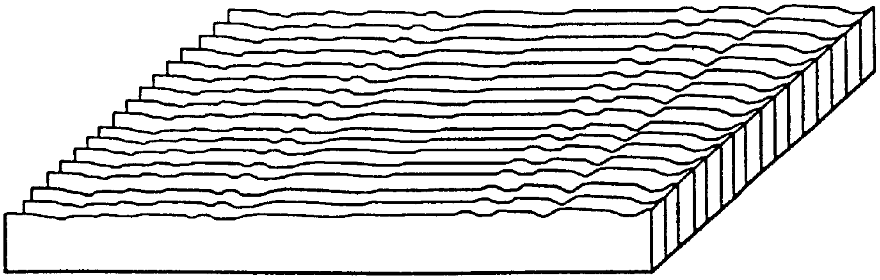

A second metal panel was coated with an aqueous surfacer for comparison (FIG. 3). Comparison of FIGS. 2 and 3 shows that the coating operation of the invention using powder coating material, in accordance with FIG. 2, gives a substantially smoother surface than the coating with aqueous surfacer, in accordance with FIG. 3.

Perthormetric measurement of the powder coating surfacer shows complete levelling of the abrasion scars (FIG. 2), whereas an aqueous surfacer, applied conventionally at 35 $\mu$m, leaves behind considerable marks (FIG. 3).

Figure 4:
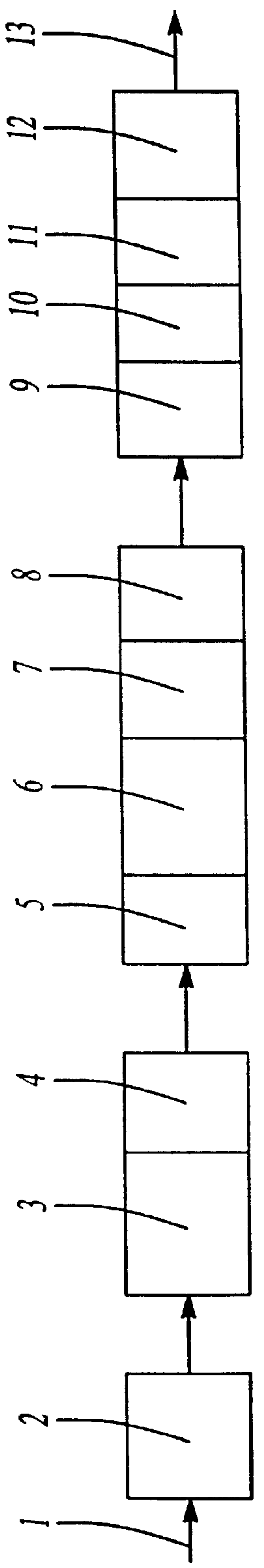

FIG. 4 depicts by way of example the procedure of coating a vehicle body.

The body to be coated passes via the entry 1 into the pretreatment stage 2. This is followed by electrodeposition coating 3 and the baking 4 of the electrodeposition coat. In stage 5 preparation takes place for coating material (stage 6).

TABLE 3

| | Clearcoat 1 | Clearcoat 2 | Clearcoat 3 | Clearcoat 4 | Clearcoat 5 | Clearcoat 6 |
|---|---|---|---|---|---|---|
| Comp. 1a | 73.9 | | | | | |
| Comp. 1b | | 93.5 | | | | |
| Comp. 1c | | | 77.0 | | | |
| Comp. 1d | | | | 91.0 | | |
| Comp. 1e | | | | | 76.7 | |
| Comp. 1f | | | | | | 86.7 |
| Comp. 2a | 26.1 | 6.5 | | | | |
| Comp. 2b | | | 23.0 | 9.0 | 23.3 | 13.3 |
| Scratch resistance | poor | good | poor | good | poor | good |
| JV(Rating)*1) | 4.0 | 4.0 | 4.5 | 4.5 | 3.0 | 3.0 |
| Stone chipping | poor | good | poor | good | poor | good |

*1) Rating after 14 weeks of outdoor weathering in Jacksonville/Florida no damage, 10 = case for complaint)

EXAMPLE 4

Preparing a Substrate Provided with a Multilayer Coating

Using 180 grade abrasive paper, abrasion scars are produced artificially (cf. FIG. 1) on a metal panel made of material common in motor vehicle bodywork construction. A powder coating material as surfacer in accordance with Example 1 was first of all applied to this surface-defective panel by means of electrostatic adhesion. The panel provided with the powder surfacer surfacer (FIG. 2) was then IR-irradiated for 4 minutes, in the course of which a temperature of about 200° C. was established. At this point, the powder coating surfacer was melted and crosslinked. In the present example, it was not possible to detect any residual reactivity from the crosslinking reaction of polyester resin and epoxy resin by DSC examination. A virtually smooth filled surface was the result. Following the IR irradiation, a decorative coating material in accordance with Example 2.1 was applied with the customary spraying technique followed by a drying procedure for film formation. A transparent powder coating dispersion in accordance with Example 3.1 was sprayed onto the incipiently dried decorative coating material. Finally, the panel coated in this way was subjected to a baking process stage at 150° C. for 20 minutes.

The layer thicknesses for the finished multilayer coating were as follows: surfacer layer: 60 $\mu$m, decorative layer: 16 $\mu$m, protective layer: 40 $\mu$m. The surface of the multilayer coating gave a flawless visual impression. In particular, no signs of the surface defects of the metal panel were in evidence. The stone-chip resistance in accordance with In stage 7 drying is carried out with IR irradiation. This is followed by the cooling stage 8. The powder coatimg material is applied to the powder coat in stage 9. Following passage through the intermediate during stage 10 a protective coat is applied in stage 11 and then is baked in stage 12. The body is transported out of the unit via the exit 13.

What is claimed is:

1. A coated substrate having thereon a multilayer coating comprising a surfacer layer, a decorative layer and a protective layer, the surfacer layer being closest to the substrate and the protective layer furthest from the substrate, the aqueous decorative coating material used for the decorative layer comprising a binder selected from the group consisting of acrylate resins, carboxyl-, epoxy-, and hydroxyl-containing binders and mixtures thereof and comprising a crosslinker selected from the group consisting of isocyanates, amino resins, tris(alkoxy carbonylamino) triazine, and mixtures thereof and the aqueous protective coating material used for the protective layer being selected from the group consisting of one-component clearcoats, two-component clearcoats, and transparent powder coating materials and the surfacer layer is formed from a pre-crosslinkable powder coating material, the surfacer layer of powder coating material having a layer thickness in the range from 30 $\mu$m to 250 $\mu$m.

2. A coated substrate as claimed in claim 1, wherein the decorative layer has a layer thickness in the range of 10 $\mu$m to 100 $\mu$m and in that the protective layer has a layer thickness in the range from 20 $\mu$m to 150 $\mu$m.

3. A coated substrate as claimed in claim 1 or 2, wherein the surfacer layer has a layer thickness in the range of 50 $\mu$m to 80 $\mu$m, the decorative layer has a layer thickness in the range of 15 $\mu$m to 17 $\mu$m, and the protective layer has a layer thickness in the range from 35 $\mu$m to 50 $\mu$m.

4. A coated substrate as claimed in claim 1, wherein the surfacer layer lies directly on the substrate material.

5. A coated substrate as claimed in claim 1, wherein the substrate is a metal panel.

6. A coated substrate as claimed in claim 1, wherein the substrate is a plastics moulding.

7. A coated substrate as claimed in claim 1, wherein the substrate is a motor vehicle bodywork panel.

8. A coated substrate as claimed in claim 1, wherein the substrate is a motor vehicle plastics moulding based on sheet molded compound.

9. A coated substrate provided with a multilayer coating as claimed in claim 1, wherein the surfacer layer has a layer thickness in the range from 60 $\mu$m to 70 $\mu$m, the decorative layer has a layer thickness in the range from 15 $\mu$m to 16 $\mu$m, and the protective layer has a layer thickness in the range from 40 $\mu$m 45 $\mu$m.

* * * * *